United States Patent
Bastone et al.

[11] Patent Number: 5,783,125
[45] Date of Patent: Jul. 21, 1998

[54] REINFORCED EXTRUSION PRODUCTS AND METHOD OF MAKING SAME

[75] Inventors: Andrew L. Bastone, Granville; Lawrence E. Lloyd, Alexandria; Charles D. Newby, Bexley; Paul R. Pelfrey, Pickerington; Thomas E. Philipps, Granville; Burch E. Zehner, Pataskala; Jeffrey R. Brandt, Reynoldsburg, all of Ohio

[73] Assignee: Crane Plastics Company Limited Partnership, Columbus, Ohio

[21] Appl. No.: 650,887

[22] Filed: May 17, 1996

Related U.S. Application Data

[60] Division of Ser. No. 331,348, Oct. 28, 1994, which is a continuation-in-part of Ser. No. 43,037, Apr. 5, 1993, Pat. No. 5,393,536.

[51] Int. Cl.$^6$ ............................................. B29C 47/02
[52] U.S. Cl. .................... 264/45.3; 264/45.9; 264/50; 264/54; 264/171.12; 264/171.14; 264/171.23; 264/171.24; 264/177.2
[58] Field of Search ................. 264/171.24, 171.23, 264/171.12, 149, 323, 171.1, 177.17–20, 45.9, 453, 45.5, 50, 54, 171.14; 425/112, 114, 131.1

[56] References Cited

U.S. PATENT DOCUMENTS

| | | | |
|---|---|---|---|
| 3,088,166 | 5/1963 | Colombo | 264/149 |
| 3,447,996 | 6/1969 | Himmelheber et al. | 156/244.11 |
| 3,825,641 | 7/1974 | Barnett | 264/177.19 |
| 3,946,097 | 3/1976 | Takahashi et al. | 264/171.24 |
| 4,481,701 | 11/1984 | Hewitt | 264/149 |
| 4,600,461 | 7/1986 | Guy | 156/244.12 |
| 4,685,873 | 8/1987 | Willard et al. | 156/244.12 |
| 4,770,834 | 9/1988 | Nakasone et al. | 264/236 |
| 5,089,189 | 2/1992 | Staneluis et al. | 264/45.3 |
| 5,096,645 | 3/1992 | Fink | 264/149 |
| 5,217,655 | 6/1993 | Schmidt | 264/177.2 |

FOREIGN PATENT DOCUMENTS

| | | | |
|---|---|---|---|
| 40-954 | 1/1965 | Japan | 264/171.12 |
| 51-34267 | 3/1976 | Japan | 264/171.12 |
| 53-57286 | 5/1978 | Japan | 264/171.24 |
| 58-63414 | 4/1983 | Japan | 264/171.24 |

*Primary Examiner*—Jeffery R. Thurlow
*Attorney, Agent, or Firm*—Standley & Gilcrest

[57] ABSTRACT

The present invention is a method of producing an extruded composite comprising the general steps of: (a) extruding a longitudinally oriented composite precursor coextrusion comprising: (1) at least one thermoplastic polymeric material and (2) a core mixture of at least one thermosetting resin and at least one filler material; whereby the thermoplastic polymeric material(s) is extruded so as to substantially enclose a space, and whereby the core mixture is pumped into the space; and (b) maintaining the composite precursor under conditions whereby the at least one thermoplastic polymeric material becomes cooled and the at least one thermosetting resin becomes cured so as to form the extruded composite of the present invention.

22 Claims, 3 Drawing Sheets

REINFORCED EXTRUSION PRODUCTS AND METHOD OF MAKING SAME

This is a divisional application under 37 CFR Section 1.60 of prior U.S. application Ser. No. 08/331,348 filed on Oct. 28, 1994, entitled REINFORCED EXTRUSION PRODUCTS AND METHOD OF MAKING SAME, which is a continuation-in-part of U.S. application Ser. No. 08/043,037 filed on Apr. 5, 1993, now U.S. Pat. No. 5,393,536/ issued Feb. 28, 1995, entitled COEXTRUSION APPARATUS.

TECHNICAL FIELD

The present invention relates to a method of producing a reinforced extrusion product, and the products of such a method.

BACKGROUND

In the building and construction trade there is an ongoing continuing search for inexpensive materials which can be used as substitutes for more expensive materials or materials otherwise in more limited supply. In a search for alternative materials, one must of course give consideration to whether a substitute material will provide the requisite performance characteristics. Such characteristics include strength, resilience, uniformity, workability, weatherability, density, thermal insulation value and expansion coefficient.

Of course, any substitute material must be able to be produced in sufficient quantity to meet the demands of the applications to which it is to be applied. Thus, it is desirable to be able to produce a building material in such quantity.

It is of course also desirable to be able to produce a building material quickly and efficiently, to save energy and labor. Typical building materials, such as stone, wood or metal must be harvested, transported and finished before being used. Therefore it is an object of the present invention to produce building materials that can be ready made for particular applications, and which can be produced within a range of physical characteristics such as those mentioned above.

Another desirable characteristic in a building material is that the material be workable, or at least be easily made workable. That is, it is desirable that the material be amenable to cutting and/or drilling, as well as being capable of receiving nails, dowels, screws, or fittings therefor and suitable for adhesive bonding. Thus it is an object of the present invention to produce a material which may be worked in a manner customary to the building trade and required in a variety of potential applications. It is also preferred that building materials be resistant to degrading environmental effects, such as water, sunlight, temperature change, abrasion, pests such as termites, etc. Therefore, another object of the present invention is to allow the production of building materials which may be readily used in a wide variety of interior and exterior settings while being relatively unaffected by such environmental effects, without the need for protective treatments such as staining, impregnation with chemicals, etc.

It is also an object of the present invention to be able to produce building materials which have consistent and reproducible mechanical and physical characteristics as outlined above.

Another present day concern is for the environment. Much attention has been focused on the need to recycle waste materials economically. This has meant finding uses for waste stream materials which are both safe and require little processing to the waste material to place it in a useable form. It is therefore an object of the present invention to provide a method which can be used to produce a useful product from relatively unadulterated waste materials; and which is safe for those making use of such a product. Also, there has been concern for the long term conservation of harvestable forests. Thus, an object of the present invention is to provide a building material that could be used in place of scarce resource materials, such as wood or structural metals.

For instance, in searching for wood substitutes, consideration usually must be given to whether the substitute material will provide those minimum characteristics which will allow it to perform in a given desired application. One area in which materials of the present application might be applied is as substitutes for the high grade wood used in door and window frames, furniture, and the like. Such high grade wood is in limited supply and currently limits the total production of door and window frames. It is relatively uniform in its characteristics, being generally free of knots, blemishes and other discontinuities in the wood grain, and is relatively both light and strong. Even high grade wood however does vary in its physical characteristics. Also, wood is subject to degrading environmental effects.

Accordingly, it is an object of one embodiment of the present invention to produce a substitute building material for high grade framing wood which conforms to its physical characteristic profile while being relatively inexpensive to produce. It is also possible through the present invention to produce such a substitute building material in quantities which are sufficient to fill the need for such a material.

As to the production of a material which may vary in its physical characteristics, it is desirable to be able to produce a material which might have its physical characteristics adjusted depending, for instance, on which particular grade of wood or strength of wood is to be replaced by the substitute material. It is also a goal of the present invention to produce a wood substitute material which is relatively unaffected by degrading environmental factors.

With regard to the production of composite materials in general one obstacle to be overcome is to have the component materials bond to one another. Another related concern is to provide bonding which will allow thermal expansion and contraction without causing separation of the bound materials.

The process of producing composite materials is even further complicated when it is to be carried out in a continuous process, such as in an extrusion process. In such processes, it is important that the component materials be able to go through the "mating" process wherein the heating, cooling, cross-linking and dimensional stabilization of the component materials are coordinated and calibrated. For instance, in continuous extrusion processes, it is necessary that the cooling thermoplastic component be retained in the desired finished profile in the calibration zone until it has formed a durable "skin" that will resist damage in downstream processing steps. Additionally, the thermosetting core must cure sufficiently and have sufficient hot strength during this same retention period that it will not alter the profile defined by the thermoplastic component after leaving the calibration zone. It is thus important that the uncured/uncooled composite have sufficient hot strength to retain the desired shape in the finished product. Accordingly, it is necessary to be able to provide such calibration and coordination if such component materials are to be made in a continuous process as described more fully herein.

Finally, it is always desirable to develop environmentally advantageous manufacturing processes which utilize landfill destined materials by recycling. This is one of the features provided in the present invention.

The present invention is an improvement over prior technology such as that represented by U.S. Pat. No. 4,281,492 to Schock, et al. The Schock, et al. patent teaches the filling of a thermoplastic extrudate (e.g. PVC) with a core mixture of methylmethacrylate resin and silicate spherules. The Schock, et al. patent teaches that silicate spherules, being hollow but imperforate glass spherules, achieve a high mechanical strength while reducing the shrinkage of the plastics portion of the fill material. Thus, the Schock, et al. patent teaches the use of silicate spherules for their rigidity to maintain the dimensions of the plastics portion of the fill material.

One of the disadvantages of the use of silicate spherules (whether purchased from commercial sources or obtained from waste stream sources) is that they can be destroyed by the crushing or shearing forces attendant to the extrusion process. Destruction of the silicate spherules renders them useless for their intended strengthening and density reduction purposes, and actually serve to increase density. The fill material containing crushed spherule particulates will suffer from loss of control of the predictability and uniformity of density control within the extrudate. Also, crushed spherules can have an abrasive effect on the extrusion equipment as they are mixed and forced through extruder heads and dies.

Accordingly, it is desirable to be able to produce a filled extrudate whose fill material provides strength as well as uniform and predictable density control.

It is also advantageous to supply a filler material which resists the destructive crushing and shearing forces of the extrusion process. It is further desirable to use a filler material which is not abrasive to the extrusion equipment.

Finally, it is an advantage to use a filler material which can be regularly and efficiently forced into the extrudate sleeve.

Although the advantages and goals of the present invention are described with reference to building materials, particularly as a substitute for wood, the present invention is not limited to either general or specific uses. Indeed, the potential uses of the present invention are numerous as may become apparent to one of ordinary skill in the fields of endeavor to which the present invention might be applied.

Accordingly, additional advantages or the solution to other problems may become apparent to one of ordinary skill in these arts from the present disclosure or through practice of the present invention.

SUMMARY OF THE INVENTION

The present invention has several aspects which include a method of producing an extruded composite and an extruded composite which may be produced by such method. The present invention also includes a formulation for a core material used in the method of the invention.

The method of producing an extruded composite of the present invention, comprises the general steps of (a) extruding a longitudinally oriented composite precursor comprising: (1) at least one thermoplastic polymeric material and (2) a core mixture of at least one thermosetting resin (with cure initiator) and a filler material comprising hollow polymeric spherules, referred to as polymeric microspheres, whereby the thermoplastic polymeric material(s) is extruded so as to substantially enclose a space, and whereby the core mixture is disposed in the space; and (b) maintaining the composite precursor under conditions whereby the at least one thermoplastic polymeric material becomes cooled and the at least one thermosetting resin becomes cured so as to form the extruded composite of the present invention. It has also been found that the hollow polymeric spherules can be maintained under sufficient temperature and pressure (attendant to the extrusion process) to decease their volume such that, when they are returned to ambient pressure while filling the space in the thermoplastic material, they are able to expand to better fill the provided space. Also, the reduced volume of the filler material during extrusion makes the extrusion process more efficient.

It will normally be preferred that the thermoplastic polymeric material(s) completely enclose the space to be occupied by the core mixture. It is also generally preferred that the core mixture is coextruded with the thermoplastic polymeric material(s) at a rate whereby the core mixture substantially fills the space created by the thermoplastic polymeric material(s). For purposes of strength and dimensional stability, it is also preferred that the core mixture be selected so as to bind, chemically or mechanically, through adhesion, to the thermoplastic material(s). The method of the present invention features a thermosetting core which cures continuously with the thermoplastic sleeve and becomes bonded to the thermoplastic sleeve.

The composite of the present invention may be formed into any cross-sectional shape in accordance with known practice in the use of extrusion dies. Any die cross-section may be selected so that the cross-section of the longitudinally oriented composite precursor is appropriately shaped for the desired application or appearance. Such cross-sectional shapes may include a shape selected from the group consisting polygons, squares, rectangles, triangles, quadrilaterals, circles, and ovals. Irregular shapes may also be formed as the desired application dictates. The possible shapes are as variable as those which may be obtained from extrusion dies used in accordance with the present invention.

The thermoplastic polymeric material(s) used in accordance with the present invention may be selected from any thermoplastic material amenable for use in an extrusion in accordance with the practice of the method of the present invention, or mixtures of such materials. Such materials may include, for instance, polyvinylchlorides (PVC), chloropolyvinylchlorides and fluoropolymers, and mixtures thereof. An example of suitable PVC material is medium impact, weatherable, rigid PVC, such as Formulation No. 7084-138, commercially available in cube form from Geon Company of Avon Lake, Ohio.

In applications where it is desirable to provide an additional layer of a thermoplastic material, this may be done by the coextrusion of an additional layer of a thermoplastic material, such as through the use of an additional extruder head.

The thermosetting resin(s) used in accordance with the present invention may be selected from any resin material amenable for use in an extrusion in accordance with the practice of the method of the present invention, or mixtures of such materials. Such materials may include, for instance, thermosetting urethane resins and polyester resins, preferably a neopentyl glycol polyester resin such as Formulation No. E-120, commercially available from Owens-Corning Fiberglas Company of Toledo, Ohio. Typical urethane resins are those commercially available from Miles Company of Pittsburgh, Pa. It is preferred that the resin(s) be selected so as to bind with the chosen thermoplastic polymeric material (s). For instance, where the chosen thermoplastic polymeric material is polyvinylchoride (e.g. Geon Formulation No. 7084-138), the resin may be a neopentyl glycolstyrene base polyester resin such as Formulation No. E-120, commercially available from Owens-Corning Fiberglass Company of Toledo, Ohio. Blends of E-120 resin and other polyester resins (such as vinyl ester types) may also be used. Urethane resins also have particularly good bonding characteristics and may be foamed.

The thermo setting resin will normally be used with one or more catalysts, polymerization initiators and accelerators, or combinations thereof, in accordance with known practice in the art. For instance, the E-120 resin will be mixed with a polymerization initiator catalyst such as Cadet benzoyl peroxide 78. Initiators may be used for polyester resins and other vinyl cross-link type resins.

The filler material of the present invention comprises hollow thermoplastic spherules which may be obtained from commercial sources. The polymeric spherules may be of any thermoplastic material, examples of which include polyvinylidine chloride, acrylonitrile copolymers, and other styrene-resistant polymers. It has been found that polymeric spherules resist crashing and shearing forces in the extrusion process. Also, the pressure applied during initial extrusion compresses the spherules which makes pumping more efficient and causes the spherules to better fill the thermoplastic sleeve by re-expanding once they have entered the sleeve under ambient atmospheric pressure. Typical of the diameters of these spherules are those within a range of from about 7 to 210 microns, although others outside this range may be suitable. Examples of such thermoplastic microspheres include those sold under the trademark DUALITE® by Pierce & Stevens Corp. of Buffalo, N.Y. An example is DUALITE® M6032AE.

The thermoplastic spherules may be used along with other filler materials. The percentage of the filler material made up by the thermoplastic spherules may be varied in accordance with the desired physical characteristics of the finished product. For instance, the filler may comprise about 75% thermoplastic microspheres and about 25% by volume fly ash, to produce a wood substitute material.

The other filler material(s) which may be used in accordance with the present invention may be selected from any filler material which will yield the desired combination of physical characteristics. Such physical characteristics include density, strength, coefficient of linear expansion, etc. Variations or substitutions in the filler materials may be made to vary the overall physical characteristics of the finished composite, depending upon the desired product.

For instance, the filler material(s) may be such materials as fly ash (amorphous silica/aluminum oxide/iron oxide glassy solid beads obtained from American Electric Power), reinforcing fibrous materials of any inorganic, organic or synthetic nature, such as chopped strand materials (e.g. glass reinforcing fibers), plant material such as ground corn cobs and sawdust, inorganic and mineral fillers (such as amorphous siliceous mineral silicate like Perlite® commercially available from P.V.P. Industries), and similar filler materials.

The filler material may also include longitudinally extending material(s). Such materials may be straight, wound or braided natural fibrous materials, such as hemp materials, and/or straight, wound or braided synthetic fibrous materials, such as aramid fibers, carbon fibers, graphite fibers, polyester fibers, nylon fibers, fiberglass and other commercially available fibers.

The filler material may also include such fibrous material (s) as mentioned above which have been shortened, milled or chopped, such as Owens Corning 101C 1/4" chopped strand glass fibers.

Such particulate filler materials may act as micro-reinforcement for the finished composite.

The filler material may also include longitudinally extending metal cords, sheets, rods and wire material such as insulated wire which may be used for the transmission of electrical current and/or signals. Electrical wires can be used in a wide variety of applications where it is desirable to incorporate electrical current or signal transmission means in a building material.

Likewise, the filler material may also include a longitudinally extending fiber optic material which may be used for the transmission of light signals. This optional construction can be used in any of a variety of applications where it is desirable to incorporate electrical light signal transmission means in a building material.

Finally, the filler material may include waste material from the process itself. Such waste material may be ground extrudate which may be mixed with other filler.

The core mixture may also be made to contain a gas as a filler material in a desired amount in order to vary the physical characteristics. For instance, gases can be provided to the core material through the use of gas- or air-containing filler material. These so-called "microsphere" materials, such as those sold under the 3M Scotchlite® name, are commercially available from 3M Corporation. An example is 3M K-20 microspheres. Such materials contain air or a pure gas as a known component of their total volume and can therefore be used to incorporate a known amount of a gas, such as air, into the core material.

Another way of incorporating a gas into the core mixture is through the use of foaming agents which produce a gas (usually a gas such as nitrogen or carbon dioxide) during the extrusion process. The amount of such foaming agents can be controlled to determine the amount of gas per total volume to be incorporated into the finished composite product. Yet another way of incorporating a gas into the mixture is through the use of physical agitation, such as may be made in the mixing process, to incorporate air into the resin. For instance, by use of the aforementioned techniques (or others) the core mixture may be provided with a gas present in an amount necessary to achieve the required core density thermal properties or other desired property. In the case of the production of a wood replacement product, the required density may be achieved by adjusting the volume of gas in the core material, which varies with the overall core material formulation.

It is also a feature of the present invention that materials of the method of the present invention can be recycled within the process by grinding, such as extrudate cuttings, so that they might be reused as a component of the core material filler. In this way the present invention can avoid the necessity to dispose of any unused extrudate, which may be spare ends from extrusion runs, blemished extrudate, etc.

It is normally the case that the thermosetting resin(s), used in accordance with the present invention, cure(s) through an exothermic reaction. The curing reaction may be initiated by a heat activated catalyst and/or the heat present in the thermoplastic material(s) during extrusion which arises from the heat of the thermoplastic material(s) and the friction attendant to the extrusion. Thus, because the curing reaction adds heat to the newly extruded material, it is in such cases necessary to cool the extrudate for an extended period of time, longer than is normally undertaken in standard thermoplastic extrusion processes. Appropriate cooling rates are required such that the composite precursor is cooled at a rate sufficient to maintain the temperature of the extrudate in the calibration zone within a range such that the extrudate will maintain its desired shape. This rate may vary depending upon the thermoplastic/thermosetting resin/filler combination.

In some instances, it may be necessary to provide the thermosetting resin with additional heat to stimulate reaction. This may be done by supplementing the heat of the extrusion process with additional heating, such as through radio frequency or induction heating, radiant heating, or the like. Cooling rates may have to be adjusted accordingly to remove the increased amounts of heat in the newly formed extrudate.

The present invention also includes an extruded composite made in accordance with the method of the present invention, the composite comprising: (a) a longitudinally oriented outer layer substantially enclosed in a space and comprising at least one thermoplastic polymeric material; and (b) a cured core mixture of at least one thermosetting resin and at least one filler material, as described herein, disposed in the space.

It is preferred that the thermoplastic material(s) of the outer layer completely enclose the space. It is also preferred that the cured core mixture substantially fills said space. To do this, it is preferred that the core mixture be coextruded with said at least one polyvinylchloride material at a rate whereby said core mixture substantially fills the space.

The extruded composite may be formed into any cross-sectional shape, such as a shape selected from the group consisting polygons, squares, rectangles, triangles, quadrilaterals, circles, and ovals.

For the purpose of providing a wood substitute, the extruded composite preferably should have density in the range of from about 0.4 to about 0.8 grams per cubic centimeter, and a relatively low coefficient of linear expansion in the range of from about 0.5 to about $1.5 \times 10^{-5}/°F$. is desirable. For such purposes it is also preferred that the cured core mixture comprises a gas present in an amount required to achieve the above density range.

The thermoplastic material(s), thermosetting resin(s) and filler material(s) may be selected from any of those described hereinabove.

The present invention also includes an extrudable polymeric precursor material which may be used as the core material described above. The extrudable polymeric precursor material generally comprises a mixture of at least one thermosetting resin and at least one filler material. The thermosetting resin(s) used in accordance with the present invention may be selected from any resin material amenable for use in an extrusion in accordance with the practice of the method of the present invention, or mixtures of such materials. Such materials may include, for instance, polyesters, polyurethanes, phenolics, epoxides, vinyl esters, furans, allyls, etc.

In addition to the hollow polymeric spherules, the filler material(s) used in accordance with the present invention may be selected from any filler material which will yield the desired combination of both physical characteristics in the cured mixture, and processing requirements. Such physical characteristics include density, strength, coefficient of linear expansion, etc. Variations or substitutions in the filler materials may be made to vary the overall physical characteristics of the finished composite, depending upon the desired product.

For instance, the filler material(s) may also include inert materials such as fly ash, chopped strand materials (such as glass reinforcing fibers), plant material, sawdust, or similar inert materials. The filler material may also include longitudinally extending fiber material(s). Such fiber materials may be wound or braided fiber material. Examples of such materials include glass fibers, aramid fibers, carbon fibers, polyester fibers and polyethylene fibers.

DETAILED DESCRIPTION OF THE PREFERRED EMBODIMENT

In accordance with the foregoing summary of the invention, the following presents a detailed description of the one embodiment of the invention which is also presently considered to be the best mode of the invention for the purposes of preparing a wood substitute material for use in window frame construction.

Figure 1:
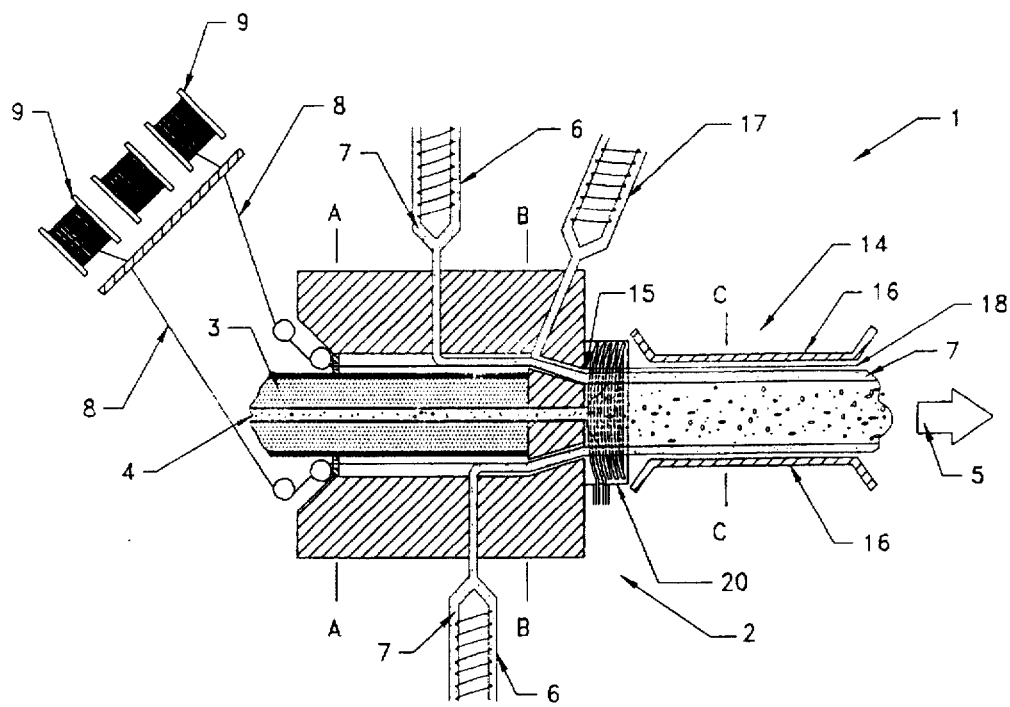
FIG. 1 shows a sectioned schematic of an extruder line used in accordance with the practice of one embodiment of the present invention.

Turning to FIG. 1, this Figure shows a sectioned schematic of an extruder line used in accordance with the practice of one embodiment of the present invention.

FIG. 1 shows extruder line 1 which includes coextrusion apparatus 2. Coextrusion apparatus includes insulated injection tube 3 which is adapted to carry core material 4 which is pumped from batch mixer (pump and mixer not shown) along longitudinal direction 5. Coextrusion apparatus 2 also includes a cross head extruder 6 (preferably a single extruder head) which are adapted to prepare the thermoplastic material 7 for extrusion through a die which forms a hollow rectangular profile and urges it also along longitudinal direction 5.

The coextrusion apparatus 2 may also be adapted to coextrude reinforcement fibers 8 from spools 9 as shown in FIG. 1.

Another optional component of the present invention is that further layers of thermoplastic material such as layer 18, can be added through the use of additional extruders such as extruder 17. Such additional layers of thermoplastic material may include layers of materials with specific characteristics for exterior use, such as fluoropolymers and PVC having greater or lesser durability and resistance to changes in aesthetic appearance resulting from exposure to weather and environmental/atmospheric conditions, as dictated by the desired end use.

Still another optional component which may be used in accordance the present invention is an additional heating means which may be used to supply additional activation heat to the core material beyond that attendant to the extrusion process itself Examples of such supplementary heating means may include radio frequency, microwave or induction heating means, shown in FIG. 1 as heating unit 20.

Figure 2:
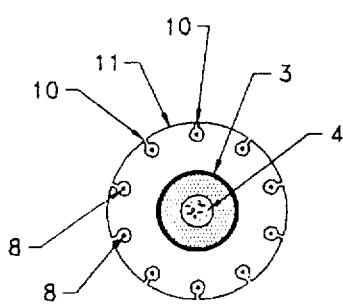
FIG. 2 is a cross-section along line A—A of FIG. 1.

FIG. 2 shows a cross-section of coextrusion apparatus 2 along line A—A. FIG. 2 shows insulated injection tube 3 which, at this point, has a relatively large thickness so as to carry the core material 4 while insulating it from the heat of the balance of the coextrusion apparatus to prevent inadvertent initiation of the curing reaction. FIG. 2 also shows fiber guides 10 in guide member 11 which serve to guide reinforcement fibers 8 through the coextrusion apparatus and orient them along the outside of insulated injection tube 3 as it carries core material 4.

Downstream of cross-section line A—A, the thermoplastic material 7 is added on either side by a cross head extruder 6 so as to ultimately enclose the core material 4.

Figure 3:
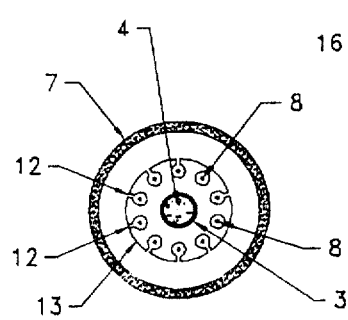
FIG. 3 is a cross-section along line B—B of FIG. 1.

Further downstream at cross-section line B—B, the width of insulated injection tube 3 is reduced, as can be appreciated from FIG. 3. As can also be seen from FIG. 3, the fiber guides 12 in guide member 13 continue to guide reinforcement fibers 8 through the coextrusion apparatus and orient them along the outside of the insulated injection tube 3 as it carries core material 4. At this point, it can be appreciated that both the width of the core material 4 and that of the circular pattern of the reinforcement fibers 8 has been reduced.

FIG. 3 also shows how an outer layer of thermoplastic material 7 has been formed so as to completely surround guide member 13 and around insulated injection tube 3 which contains core material 4. As described above, the filler material, containing hollow polymeric spherules, may be compressed through the action of pressure existing upstream of the extrusion die.

The core material 4 and thermoplastic material 7 are guided further downstream through a forming die 15 and into reaction/cooling zone 14. The thermoplastic material 7 is formed by the forming die (located at position 15) into the desired final shape, such as a rectangular cross-section. The core material is allowed to expand to fill the hollow space created in thermoplastic material 7. At this point, the core material, if extruded under pressure, will begin to fill the space inside the thermoplastic extrudate. If provided with a foaming agent, the core material will begin to form void spaces.

Figure 4:
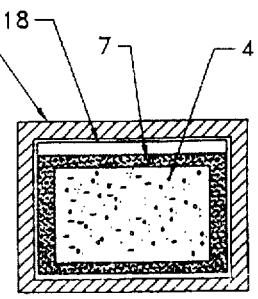
FIG. 4 is a cross-section along line C—C of FIG. 1.

The composite formed is shown in cross-section in FIG. 4. FIG. 4 shows calibration guide 16 which holds the composite which comprises the thermoplastic material 7 filled by cured thermoset core material 4 which may contain filler material(s) as desired, and may include void spaces. The calibration guide may be in the form of down-line sizing tooling, such as a vacuum sizer, or wet or dry sizers. Such tooling should be sufficiently elongated or otherwise provide sizing control over the distance necessary to bring about cooling in the extrudate to insure dimensional stability. Such control will be required in those cases where the heat generated in the cure of the thermosetting resin, together with the heat of the thermoplastic material, would maintain the extrudate at a temperature which otherwise would cause the extrudate to lose form. Such tooling should be located immediately downstream of the point at which the reacting thermosetting resin and thermoplastic material are brought together.

Figure 5:
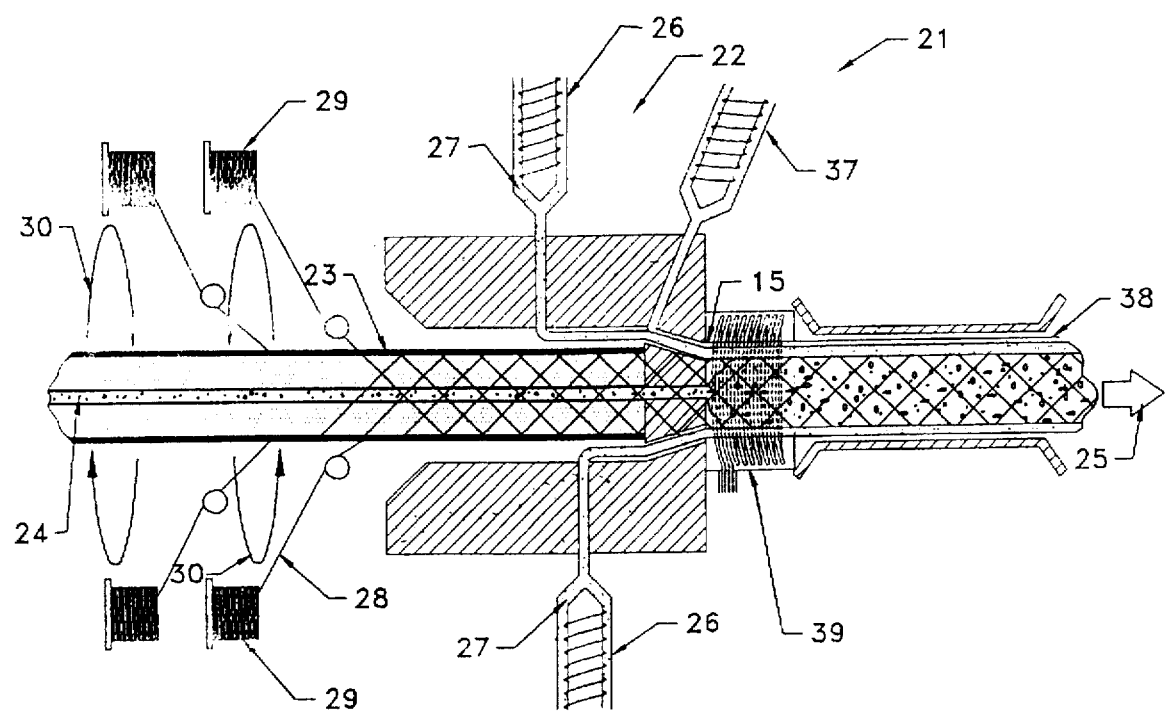
FIG. 5 shows a sectioned schematic of an extruder line used in accordance with the practice of another embodiment of the present invention.

FIG. 5 shows an alternative embodiment which is adapted to incorporate a continuously braided or woven fiber or wire material into the extrudate. Extrudates can thereby be given additional dimensional strength by providing reinforcement at an angle to the to the longitudinal axis of the extrudate.

FIG. 5 shows a sectioned schematic of an extruder line used in accordance with the practice of one embodiment of the present invention.

FIG. 5 also shows extruder line 21 which includes coextrusion apparatus 22. Coextrusion apparatus includes insulated injection tube 23 which is adapted to carry core material 24 which is pumped from batch mixer (not shown) along longitudinal direction 25. Coextrusion apparatus 22 also includes twin cross head extruders 26 which are adapted to prepare the thermoplastic material 27 for extrusion through a die which forms a hollow rectangular profile and urges it also along longitudinal direction 25.

The coextrusion apparatus 22 may also be adapted to coextrude reinforcement fibers 28 from spools 29 as shown in FIG. 5. Spools 29 are rotated and counter-rotated (as shown by directional arrows 30).

Another optional component of the present invention is that further layers of thermoplastic material, such as layer 38, can be added through the use of additional extruders such as extruder 37. Such additional layers of thermoplastic material may include layers of materials with specific characteristics for exterior use, such as fluoropolymers and PVC having greater or lesser durability and resistance to changes in aesthetic appearance resulting from exposure to weather and environmental/atmospheric conditions, as dictated by the desired end use.

Still another optional component which may be used in accordance the present invention is an additional heating means which may be used to supply additional activation heat to the core material beyond that attendant to the extrusion process itself Examples of such supplementary heating means may include radio frequency, microwave or induction heating means, shown in FIG. 5 as heating unit 39.

The following represent several optional core material formulations, exclusive of optional longitudinal fibers or wires, or optional foaming agent.

| Component | Amount (percent by weight)* |
|---|---|
| Formulation 1 | |
| Neopentyl Glycol-Styrene Base Resin (Owens-Corning E-120) | 40% |
| Amorphous Silica/Alumina Oxide/ Iron Oxide (Glassy Solid Bead Fly Ash- American Electric Power) | 27% |
| Glass Microspheres (3M Scotchlite glass bubbles) | 25% |
| Polymeric Microspheres (DUALITE ® M6032 AE) | 8% |
| Formulation 2 | |
| Neopentyl Glycol-Styrene Base Resin (Owens-Corning E-120) | 40% |
| Amorphous Silica/Alumina Oxide/ Iron Oxide (Glassy Solid Bead Fly Ash- American Electric Power) | 25% |
| Amorphous siliceous mineral silicate (P.V.P Industries Perlite) | 20% |
| Polymeric Microspheres (DUALITE ® M6032 AE) | 15% |
| Formulation 3 | |
| Neopentyl Glycol-Styrene Base Resin (Owens-Corning E-120) | 50% |
| Glass Microspheres (3M Scotchlite glass bubbles) | 15% |
| Glass Fibers (Owens Corning 101C ¼" chopped strand) | 20% |
| Polymeric Microspheres (DUALITE ® M6032 AE) | 15% |
| Formulation 4 | |
| Polyester Resin Base Resin (Owens Corning E-120) | 75% |
| Polymeric Microspheres (DUALITE ® M6032AE) | 25% |

-continued

| Component | Amount (percent by weight)* |
|---|---|
| Formulation 5 | |
| Polyester Resin<br>Base Resin (Owens Corning E-120) | 55% |
| Polymeric Microspheres<br>(DUALITE ® M6032AE) | 20% |
| Amorphous Silica/Alumina Oxide/<br>Iron Oxide (Glassy Solid Bead Fly Ash-<br>American Electric Power) | 25% |
| Formulation 6 | |
| Polyester Resin<br>Base Resin (Owens Corning E-120) | 55% |
| Polymeric Microspheres<br>(DUALITE ® M6032AE) | 15% |
| Glass Fibers (Owens Corning 101C ¼"<br>chopped strand) | 30% |
| Formulation 7 | |
| Polyester Resin<br>Base Resin (Owens Corning E-120) | 55% |
| Polymeric Microspheres<br>(DUALITE ® M6032AE) | 13% |
| Amorphous Silica/Alumina Oxide/<br>Iron Oxide (Glassy Solid Bead Fly Ash-<br>American Electric Power) | 30% |
| Milled Glass Fibers<br>chopped strand) | 2% |

*to these totals is added Cadet benzoyl peroxide catalyst in an amount equivalent 2.5% by weight of the resin (alone).

Figure 6:
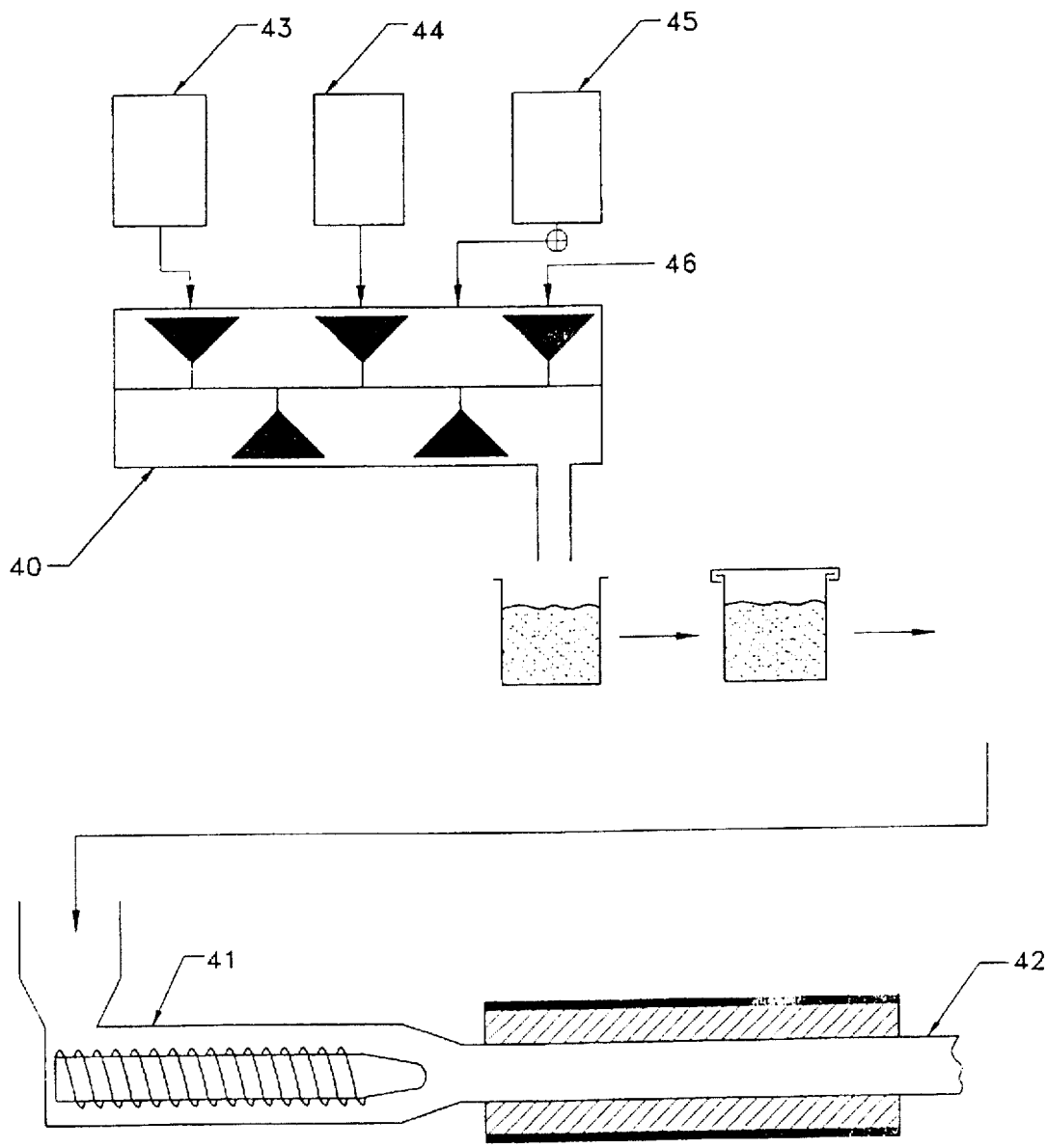
FIG. 6 shows a schematic of the mixing process for the core material.

FIG. 6 shows a schematic of the mixing process for the core material. Resin, filler material(s), catalyst and other processing aids (foaming agent, etc.), in containers 43, 44 and 45, are mixed in batch mixer 40, such as Model No. M5R, commercially available from Littleford Day Company. Minor ingredients 46 may also be added to the formulation mixture as shown. The mixture is checked for quality control purposes and then placed in core extruder 41 to be pumped through injection tube 42, as is shown in more detail in FIGS. 1 and 5 herein.

In view of the foregoing disclosure, it will be within the ability of one skilled in the art to make alterations and variations to the present invention, such as through the substitution of equivalent materials and processing steps, without departing from the spirit of the invention as reflected in the following claims.

What is claimed is:

1. A method of producing an extruded composite, said method comprising the steps of:
   a. extruding a composite precursor coextrusion comprising:
      i. at least one uncured thermoplastic polymeric material; and
      ii. a core mixture of at least one uncured thermosetting resin and a filler material, said filler material comprising hollow polymeric spherules;
      whereby said at least one thermoplastic polymeric material is extruded so as to substantially enclose a space, and whereby said core mixture is pumped into said space; and
   b. maintaining said composite precursor under conditions whereby said at least one thermoplastic polymeric material becomes cooled and said at least one thermosetting resin becomes cured so as to form said extruded composite.

2. A method according to claim 1 wherein at least one thermoplastic polymeric material completely encloses said space.

3. A method according to claim 1 wherein said core mixture is coextruded with said at least one thermoplastic polymeric material at a rate whereby said core mixture substantially fills said space.

4. A method according to claim 1 wherein said at least one thermoplastic polymeric material is selected from the group consisting of polyvinylchlorides.

5. A method according to claim 1 wherein said at least one thermosetting resin is selected from the group consisting of polyester resins, polyurethane resins, phenolic resins, epoxide resins, vinyl ester resins, furanic resins and allyl resins.

6. A method according to claim 1 wherein said hollow plastic spherules have diameters in the range of from about 7 to about 210 microns.

7. A method according to claim 1 wherein said hollow polymeric spherules comprises an acrylonitrile copolymer.

8. A method according to claim 1 wherein said filler material additionally comprises a material selected from the group consisting of fly ash, reinforcing fibers, plant material, sawdust, mineral fillers, gas-containing materials and gases.

9. A method according to claim 1 wherein said filler material additionally comprises fly ash, said fly ash comprising up to 25% of said filler material.

10. A method according to claim 1 wherein said composite precursor is extruded so as to have a longitudinal axis and wherein said core mixture contains a material extending substantially parallel to said longitudinal axis, said material selected from the group consisting of natural fibrous materials, synthetic fibrous materials, fiber optic materials and metal cords, wires, rods and sheets.

11. A method according to claim 10 wherein said material extending substantially parallel to said longitudinal axis comprises a material selected from the group consisting of glass fibers, aramid fibers, carbon fibers, polyester fibers and polyethylene fibers.

12. A method according to claim 10 wherein said material extending substantially parallel to said longitudinal axis is in a physical form selected from the group consisting of braided and wound forms.

13. A method of producing an extruded composite, said method comprising the steps of:
   a. coextruding a composite precursor comprising:
      i. at least one uncured polyvinylchloride material; and
      ii. a core mixture of at least one uncured polyester resin, and at least one filler material, said filler material comprising hollow polymeric spherules and a material selected from the group consisting of fly ash, glass reinforcing fibers, plant material, sawdust, mineral fillers and gases;
      whereby said at least one uncured polyvinylchloride material is extruded so as to substantially enclose a space, and whereby said core mixture is pumped into said space; and
   b. maintaining said composite precursor under conditions whereby said at least one uncured polyvinylchloride material becomes cooled and said at least one uncured polyester resin becomes cured so as to form said extruded composite.

14. A method according to claim 13 wherein at least one polyvinylchloride material completely encloses said space.

15. A method according to claim 13 wherein said core mixture is coextruded with said at least one polyvinylchloride material at a rate whereby said core mixture substantially fills said space.

16. A method according to claim 13 wherein said hollow polymeric spherules have diameters in the range of from about 7 to about 210 microns.

17. A method according to claim 13 wherein said hollow polymeric spherules comprise an acrylonitrile copolymer.

18. A method according to claim 13 wherein said at least one filler material is selected from the group consisting of fly ash, reinforcing fibers, plant material, sawdust, mineral fillers, gas-containing materials and gases.

19. A method according to claim 13 wherein said filler material additionally comprises fly ash, said fly ash comprising up to 25% of said filler material.

20. A method according to claim 13 wherein said composite precursor is extruded so as to have a longitudinal axis and wherein said core mixture contains a material extending substantially parallel to said longitudinal axis, said material selected from the group consisting of natural fibrous materials, synthetic fibrous materials, fiber optic materials and metal cords, wires, rods and sheets.

21. A method according to claim 20 wherein said material extending substantially parallel to said longitudinal axis is in a physical form selected from the group consisting of braided and wound forms.

22. A method of producing an extruded composite, said method comprising the steps of:

a. charging a coextrusion apparatus with the following materials:

i. at least one uncured thermoplastic polymeric material; and ii. a core mixture of at least one uncured thermosetting resin and a filler material, said filler material comprising hollow polymeric spherules having an original volume;

b. coextruding said materials under conditions of pressure and temperature whereby said original volume of said hollow polymeric spherules is reduced to a compressed volume, said at least one uncured thermoplastic polymeric material is extruded so as to substantially enclose a space, and whereby said uncured core mixture is pumped into said space; and c. maintaining said core mixture under conditions whereby the volume of said hollow polymeric spherules increases to a volume greater than said compressed volume, and whereby said at least one uncured thermoplastic polymeric material becomes cooled and whereby said at least one uncured thermosetting resin becomes cured so as to form said extruded composite.

\* \* \* \* \*